Figures 1, 2, 3, 4:
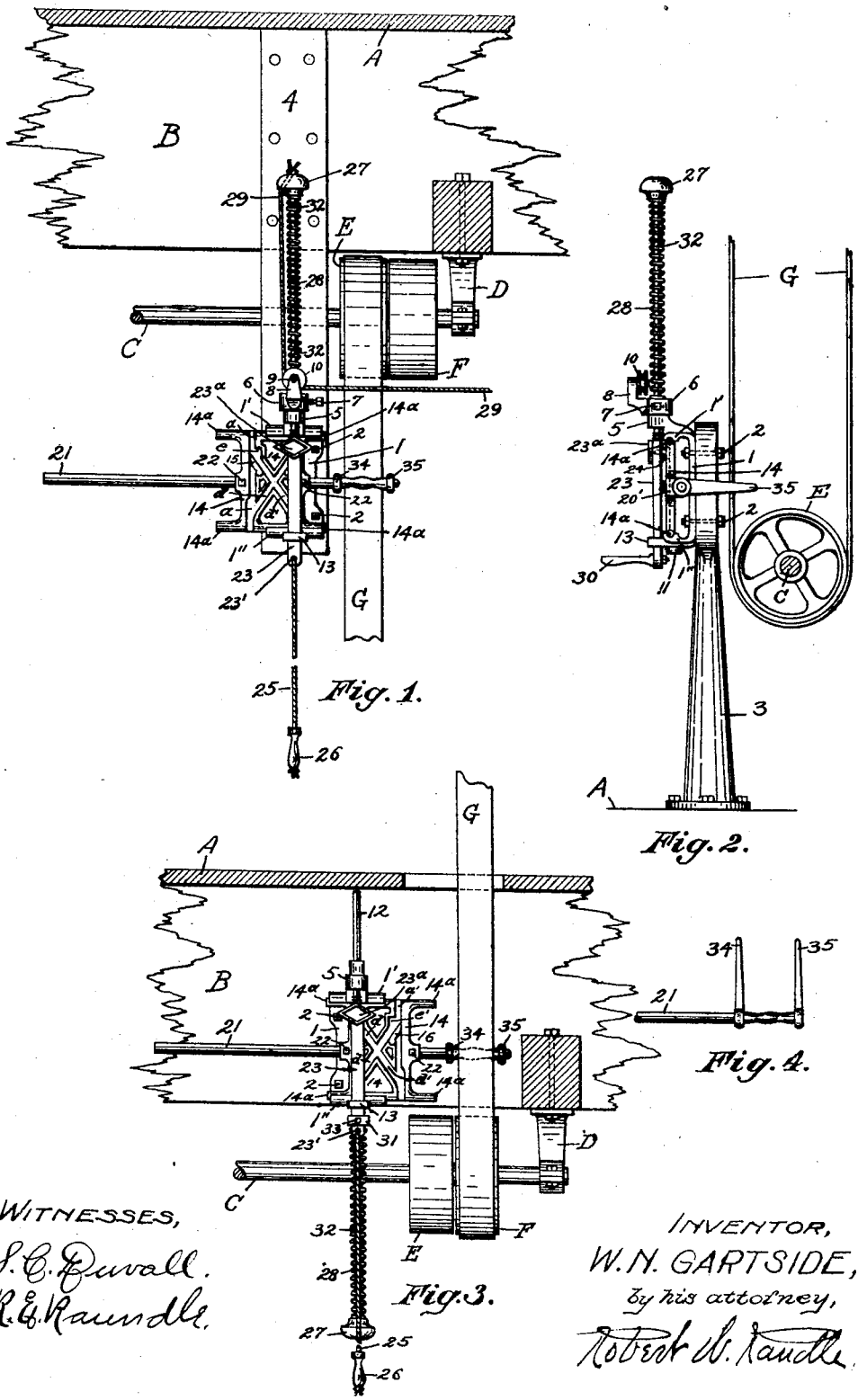

No. 771,904. PATENTED OCT. 11, 1904.
W. N. GARTSIDE.
BELT SHIFTER.
APPLICATION FILED NOV. 20, 1903.
NO MODEL. 2 SHEETS—SHEET 1.

WITNESSES
S. C. Duvall
R. E. Raundle

INVENTOR,
W. N. GARTSIDE;
by his attorney,
Robert W. Raundle

No. 771,904. PATENTED OCT. 11, 1904.
W. N. GARTSIDE.
BELT SHIFTER.
APPLICATION FILED NOV. 20, 1903.
NO MODEL. 2 SHEETS—SHEET 2.
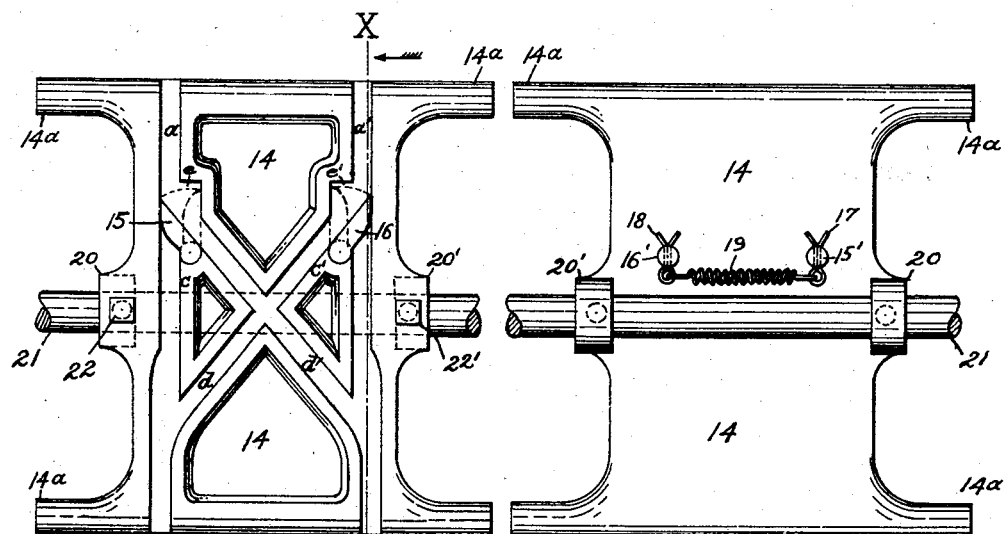
Fig. 5.  Fig. 6.
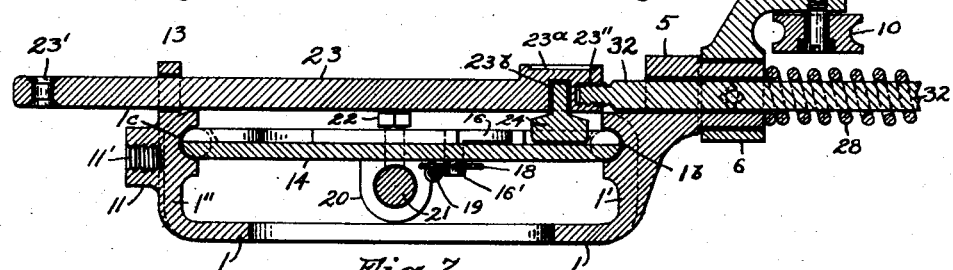
Fig. 7.
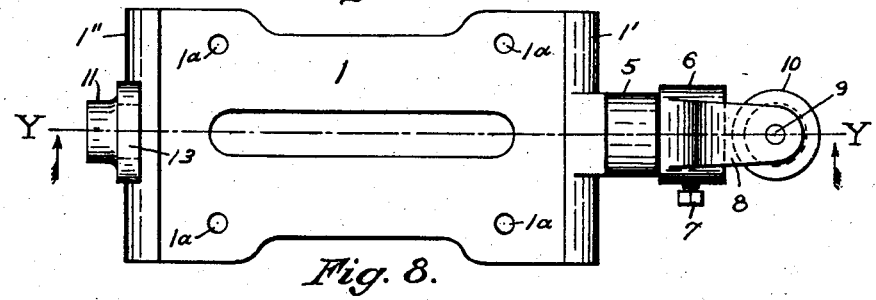
Fig. 8.
Fig. 10.
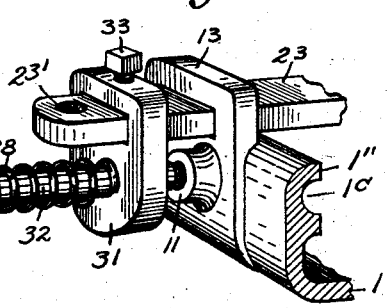
Fig. 9.
WITNESSES,
S. C. Duvall.
R. E. Raundle.
INVENTOR,
W. N. GARTSIDE;
by his attorney,
Robert W. Raundle.

No. 771,904.

Patented October 11, 1904.

UNITED STATES PATENT OFFICE.

WILLIAM N. GARTSIDE, OF RICHMOND, INDIANA.

BELT-SHIFTER.

SPECIFICATION forming part of Letters Patent No. 771,904, dated October 11, 1904.

Application filed November 20, 1903. Serial No. 181,898. (No model.)

*To all whom it may concern:*

Be it known that I, WILLIAM N. GARTSIDE, a citizen of the United States, residing in the city of Richmond, in the county of Wayne, and in the State of Indiana, have invented new and useful Improvements in Belt-Shifters, of which the following is a specification; and I do hereby declare the following to be a full, clear, and complete description of the invention, such as will enable others skilled in the art to which it appertains to make and use the same.

My present invention has reference broadly to a mechanical movement, and which is particularly applicable as a belt-shifter or the like or for other mechanical equivalents.

The object of my invention, broadly speaking, is the provision of an improved mechanism of the class stated for the expeditious shifting of machine-belts or other mechanical elements.

A more specific object is to provide a shifting mechanism to be used in connection with the transmission of power to machines by a belt operative over loose and tight pulleys and to provide efficient means for shifting the belt from one to the other of said pulleys at the will of the operator and that with absolute exactitude.

The primal object of my present invention is to provide a belt-shifter for machinery whereby the belt may be shifted from the idle pulley to the permanent pulley, and vice versa, by the same movement of the operator—that is to say, the mechanism may be actuated in one direction to move the belt from the idle pulley to the fixed pulley to throw the machinery into operative connection and then if desired to move the belt from the fixed to the idle pulley to throw the machine out of gear in that case the mechanism is to be actuated in the same direction and in the same manner as before and with identically the same movement on the part of the attendant.

Another object is to provide a simple, durable, and positive mechanism which will be compact in form and construction, easily operated and controlled, and in which the work will be performed with certainty and precision and with a minimum of time and labor devoted thereto.

Another object is the provision of a new article of manufacture, a belt-shifter of new and novel construction which can be made and sold at a comparatively low price and with the assurance that its work will be performed with accuracy and satisfaction.

Another important object is to provide a belt-shifter by the employment of which the danger of personal or mechanical injury is reduced to a minimum and in which the various operations may be easily and positively controlled.

Another object is to provide a belt-shifting mechanism involving in its construction a new and novel mechanical movement which, combined with other mechanical interrelated expedients, is intended to meet the variable emergencies in a simple mechanical manner with exactitude, and, finally, another object is to provide a mercable article of manufacture capable of a great variety of applications and having a number of appreciable modes of attachment in order to meet variable conditions and to subserve the highest economic ends.

Other specific objects and advantages of my invention will be made manifest in the following specification, and the construction shown in the accompanying drawings will visualize for any one inspecting them the several advantages hereinbefore mentioned.

My invention consists primarily in a belt-shifter embodying certain new and useful features, details of construction, and the several dispositions and configurations of the several interdependent and coöperating elements, substantially as hereinafter particularly set forth, shown in the drawings, and incorporated in the claims hereunto appended.

My invention relates to the construction clearly shown in the accompanying drawings, in which—

Figure 1 is a front elevation of my invention shown suspended from a joist or the like. Fig. 2 is a side elevation of my invention shown supported by a pedestal of any preferred construction. Fig. 3 is a front elevation of my invention shown secured directly to a joist or the like. Fig. 4 is a detail view of the shifting prongs or fingers. Fig. 5 is a detail face view of the shifting plate. Fig. 6 is a detail rear view of the shifting plate. Fig. 7 is a sectional view taken on the line X X of Fig. 5 and on the line Y Y of Fig. 8. Fig. 8 is a rear view of the body-plate forming the basic and stationary part of my construction. Fig. 9 is a detail view in perspective of a portion of the invention, and Fig. 10 is a face view of the follower.

Similar characters refer to and denote like parts throughout the several views of the drawings.

In order to make clear the construction and operation of my invention whereby a mechanic will have no difficulty in fully constructing my invention, I will now take up a detail description thereof, which I will set forth as briefly and compactly as I may.

Referring now to the drawings, the letter A designates the floor-line of a building. B denotes the overhead joists of a building. C denotes a continuously-revolving shaft. D denotes hangers for said shaft. E denotes a pulley secured to said shaft. F denotes a loose pulley of same size and contiguous to the pulley E, and G is a belt to be shifted from one to the other of the peripheries of said pulleys. All of said parts are of any well-known form and construction and which may be variously modified to meet varying conditions.

The numeral 1 refers to the body-plate of my device, which is substantially rectangular in contour and with a plurality of bolt-holes therethrough to provide means for its being secured by the bolts 2 to some permanent object.

The numeral 3 refers to a pedestal to be secured to the floor A and project upward, as in Fig. 2, having a vertical face on its upper portion with holes therethrough corresponding with and disposed as are the holes in the plate 1, whereby the back of the plate 1 may be contacted with the face of the pedestal and secured thereto by said bolts 2, as shown in Fig. 2.

The numeral 4 denotes a slat or hanger secured to the joist B and extending down some distance therebelow, with holes through its lower portion corresponding to and disposed as the holes $1^a$ in the plate 1, whereby the back of the plate 1 may be secured in contact therewith by said bolts 2, as shown in Fig. 1. In Fig. 3 the plate 1 is shown secured directly to the joist B in same manner as above stated. The plate 1 has integral outwardly-extending end portions $1'$ and $1''$, forming horizontal guides at right angles to the plate 1 and disposed above and below, respectively, as is made apparent in Fig. 7. In the oppositely-disposed inner faces of each of the horizontal guides is a half-round horizontal groove $1^b$ and $1^c$, respectively, arranged vis-à-vis, as in Fig. 7, which extend entirely across the oppositely-disposed faces of the horizontal guides, as shown. Integral with and extending upward and forward from the top of the upper horizontal guide is the vertical guide 5, with a round vertical aperture therethrough, the upper round portion being decreased in size to receive and form a shoulder for the swivel-hanger 6. The said hanger 6 has an opening vertically therethrough to receive said decreased portion of the vertical guide 5 and with a horizontal threaded aperture in its shank to receive the set-screw 7, by which the swivel-hanger 6 may be secured to the vertical guide 5. Integral with and extending outward and upward from one side of the swivel-hanger 6 is an arm 8, carrying near its upper end an inwardly-projecting pintle or screw 9, on which latter is revolubly mounted the channel-wheel 10, the purpose of said parts being hereinafter stated. Extending down centrally from the horizontal guide $1''$ is a protuberance 11, having an internally-threaded cavity to receive the threaded end of the rod 32 when desired to have it inserted therein, as hereinafter set forth. Integral with and extending out centrally from the horizontal guide $1''$ at right angles to the protuberance 11 is a guide 13, formed with a vertical rectangular slot therethrough which is in alinement with the round aperture in the guide 5, above referred to.

The numeral 14 denotes the shifting plate, having half-round upper and lower edges and with the round arms $14^a$ extending out horizontally from each of its four corners to form guides. The vertical length of the plate 14 is such that its rounded ends and arms will neatly fit and be adapted to reciprocate on the grooves $1^b$ and $1^c$, as indicated in Fig. 7. Near each side in the face of the plate 14 are the two substantially parallel shaped grooves $a$ and $a'$, extending entirely across the face of said plate, whose lengths are the same as the distance the belt is to be shifted—that is, substantially the width of one of the pulleys—and whose lower portions are canted or deflected outward opposite to each other, whereby said lower portions are farther apart than at the upper greater portions of their lengths, forming the outward curves, as shown in Fig. 5.

The letters $d$ and $d'$ denote the two angularly-disposed ⌐-shaped grooves, which intersect and cross each other in the center and also intersect the grooves $a$ and $a'$ some distance from the ends of the latter, as shown in Fig. 5, the object of said curves or outer expansions of the lower portions of the grooves $a$ and $a'$ being that the plate 14 may have a lateral movement in either direction slightly greater than that required to shift the belt the required distance in order that the shifting plate may have a slight lead over the movement of the belt and in order that when the bar 23 is released to carry the follower 34 upward the follower will be deflected into the narrower portion of the grooves $a$ and $a'$ without danger of its entering the grooves $d$ and $d'$. Said grooves $a$, $a'$, $d$, and $d'$ may, if desired, under certain conditions be disposed in different lines and angles and with different contours from that shown in order to give a differential motion to the plate 14, whereby said plate may be caused to move faster or slower at different points in its movements or that it may be moved with less power in one or more portions of its movements. In the upper portions of the deltoids $c$ and $c'$ is pivoted the deflecting-detents 15 and 16, each having permanently secured thereto and extending rearward through holes in the plate 14 the respective shafts $15'$ and $16'$, which shafts project beyond said plate in the rear, with holes therethrough at right angles thereto to receive the keys 17 and 18, as shown in Fig. 6. Above the junctions of the upper sides of the grooves $d$ and $d'$ with the inner sides of the grooves $a$ and $a'$ are formed notches $e$ and $e'$, extending inward toward each other to provide spaces for the detents 15 and 16, respectively, whereby the said detents may stand vertical and out of the path of the respective grooves $a$ and $a'$ and across the path of the grooves $d$ and $d'$ when said detents are forced out of their normal positions, as will presently appear.

The numeral 19 denotes a helical spring suspended at either end in the eyes of the keys 17 and 18 and with its tension contractile—that is, such as to normally retain the beveled sides of the detents against the outer sides of the grooves $a$ and $a'$ and disposed thereacross on a line with the lower sides of the grooves $d$ and $d'$, as shown in Fig. 5. Extending rearward from the center of the sides of the plate 14 are the lugs 20 and $20'$, with horizontal openings therethrough to receive the rod 21, and said rod is adjustably secured by the set-screws 22 and $22'$ in said lugs to meet varying conditions.

The numeral 23 designates a bar slidable vertically through the aperture in the guide 13, extending therebelow, with an eye $23'$ formed therethrough in its lower portion, in which is secured the upper end of the cord 25. Said bar has a threaded cavity $23''$ extending down into its upper end and has a diamond-shaped name-plate $23^a$ on the face of its upper portion, as shown, said cavity $23''$ being for the purpose of receiving the threaded end of the rod 32 or in place of the latter the rod 12. In the center of the back of the bar 23 is a round smooth cavity $23^b$ to receive the shank of the oblong-headed follower 24, which is adapted to rotate therein. Said follower 24 is of a size in cross-section slightly less than the contour of said grooves $a$, $a'$, $d$, and $d'$ and in which it is adapted to travel and is of a length somewhat more than twice its width. The eye $23'$ is adapted to secure the upper end of a cord or the like 25, which cord is provided with a handle 26, secured to its lower end within easy access of the operator of the device. The rod 32 is threaded on its lower end to be secured in the cavity $23'$, as aforementioned, and extends upward, as in Figs. 1 and 2, through and beyond the guide 5, and consequently the swivel-hanger 6, some distance thereabove, with a knob 27 secured to its upper end and with a somewhat compressed helical spring 28 encircling it, said spring 28 being seated against the flange of the guide 5 and the knob 27 below and above, respectively, as shown, whereby the bar 23 is normally kept raised to the highest point of its travel.

It will now be seen in Fig. 1 that by pulling down on the handle 26 immediately below the device the bar 23 will be moved down endwise against the torsional force of the spring 28, and by the recoil of said spring the said bar will be returned to its normal position when said handle is released. The travel of the bar 23 is limited to the distance between the horizontal guides $1'$ and $1''$. Should it be desired to operate the bar 23 at a distance from the device other than immediately below it, then in that case I secure one end of a cord 29 to the knob 27, extending said cord down under and in the channel of the wheel 10 and then out horizontally to the point desired, where it may be passed over an independent channel-wheel and then extended down, with its lower end provided with a handle within reach of the operator.

Where it is desired that my device should be located near the floor, I have provided a pedestal 3, as in Fig. 2, in which case the cords 25 and 29 may be dispensed with and the operation performed by pressing down on the knob 27, or the operation may be performed with the foot of the attendant by pressing down on the pedal 30, which latter may be secured in the eye $23'$, as illustrated in Fig. 2.

Under conditions in which my device is attached direct to the joist B, as in Fig. 3, there will not be sufficient room for the rod 32 to project upward, as in Figs. 1 and 2, in which case the rod 32 is removed and turned end for end and inserted in the protuberance 11, as in Figs. 3 and 9, and a shorter auxiliary rod 12 is secured in the cavity $23''$, whose length is substantially equal to the movement of the bar 23 and acts as an upper guide therefor, while the rod 32 and its spring 28 is made to answer the same purpose as in its former position by the employment of a link 31. (Shown in Figs. 3 and 9.) The link 31 has a slot therethrough to receive the lower end of the bar 23, to which it may be adjustably secured by the set-screw 33, and an eye is placed through the link 31, through which may freely pass the rod 32, and in this instance the upper end of the spring 28 is seated against the link 31, while the lower end, as before, is seated against the knob 27, by which it is apparent that the same action on the bar 23 is attained in the arrangement shown in Fig. 3 as that of the arrangement shown in Figs. 1 and 2. On one end of the said rod 21 is secured a pair of ensiform parallel fingers 34 and 35, whose distance apart is slightly more than is the width of the belt G, which they are adapted to astride.

It is apparent that the bar 23 will normally be in the position shown in Figs. 1 and 3 and that by moving said bar 23 down to its limit by any of the means above designated the follower 24 will be carried downward in the groove $a'$ until it impinges the detent 16, and thereby be deflected into the groove $d$, by which the plate 14 will be carried laterally to the right, allowing the follower to enter the lower portion of the groove $a$. The plate 14 will carry the rod 21 and that in turn the fingers 34 and 35, thus resulting in said fingers forcing the belt G from the pulley E to the pulley F. The bar 23 being released the spring 28 will carry it upward to its highest point, causing the follower 24 to pass through the groove $a$, (deflected thereinto by the outer curved portion at the lower portion thereof,) which will place said parts as in Fig. 3, and now desiring to return the belt G from the pulley F to the pulley E the bar 23 is moved down, as before, to its limit, causing the follower 24 to be carried downward into the groove $a$ until it impinges the detent 15, and thereby be deflected into the groove $d'$, by which the plate 14 will be carried laterally to the left, allowing the follower to enter the lower portion of the groove $a'$, and consequently resulting in the reverse operation from that above stated. After the last-named operation the bar 23 being released the spring 28 will carry it upward to its highest point, causing the follower 24 to pass up through the groove $a'$, (deflected therein by the outer curved portions at the lower portion thereof,) which will position said parts as shown in Fig. 1.

From the above it will be apparent that my device may be positioned in a number of ways and operated with celerity from a number of points, that its resultant operations will result in a consequent positive action, and that the device may be locked in either one of two positions against accidental movement.

From the above description, taken in connection with the accompanying drawings, it will be manifest that I have produced an improved belt-shifter or mechanical movement embodying the objects hereinbefore referred to in this specification.

While I have shown and described the best means to me known at this time for carrying out my invention in a practical manner, I desire it to be understood that I do not restrict myself to the exact details of construction shown and described, but hold that any changes or variations therein as would suggest themselves to the ordinary mechanic would clearly fall within the limits and scope of my invention.

Having now fully shown and described my invention, what I claim, and desire to secure by Letters Patent of the United States, is—

1. In a device of the kind described, the combination, of a fixed plate, a horizontally-movable plate carried by and over the fixed plate, the movable plate having a pair of parallel grooves and a pair of angularly-disposed cross-grooves opening into the parallel grooves formed in its face, a bar slidable vertically over said movable plate, a follower pivoted on said bar and adapted to travel in said grooves, detents mounted below the upper junctions of said grooves, means for normally retaining said detents across the paths of the parallel grooves and on a line with the lower walls of the cross-grooves, means for moving said bar downward for shifting the movable plate to the right or left, means for securing a rod to said movable plate, and fingers secured to the last-named rod for engaging the sides of a belt, all substantially as shown and described.

2. In a device of the class described having a plate 1 secured in position, there being horizontal guides extending out from said plate forming guideways, hangers extending out from said horizontal guides beyond said guideways, a shifting plate 14 mounted for horizontal movement in said horizontal guides and having vertical parallel grooves formed on either side in its face and having angularly-disposed grooves crossing each other and opening into said parallel grooves also formed in its face, a detent pivoted immediately below each of the upper intersections of said grooves, a shaft projecting from each of said detents through apertures in said plate 14, a spring connecting said shafts in the rear of the plate 14 whereby said detents are normally retained at an angle across said parallel grooves, a vertically-slidable bar movable in said hangers with a cavity in the rear side thereof near its upper portion, an oblong follower having a shank pivoted in said cavity, a rod continuing up from said bar, a spring encircling said rod to normally retain said rod to its highest point, means for moving said bar downward manually, and means for moving said bar upward mechanically, substantially as shown and described.

3. In a shifting mechanism, a fixed vertical plate having an upper and lower outwardly-extending horizontal guides with guideways, means carried by said horizontal guides for carrying a vertically-slidable bar, a horizontal movable plate mounted between said permanent plate and said bar and carried in said guideways and having parallel and cross intersecting grooves formed in its face, a follower pivoted on the rear of said bar with its head adapted to travel in all of said grooves, means for deflecting said head from a parallel to a cross groove as said bar is lowered, and a spring for moving said bar upward, all substantially as described.

4. In a belt-shifter the combination with a fixed plate having guideways and hangers, a movable plate operative back and forth in said guideways and having grooves formed in its face, a follower having an oblong head adapted to slide in said grooves, a shank integral with said follower pivoted in said bar, detents controlled by a spring for closing certain portions of said grooves and to deflect the course of said follower in its downward movements, means for moving said bar manually in one direction and automatically in the opposite direction, and means for applying the movements of said movable plate to shift a belt, all substantially as shown and described.

5. In a shifting mechanism containing means for shifting a belt or the like from one to the other of two pulleys by the movement of the operating-bar in one direction, a rod projecting from said bar, a coil-spring encircling said rod to provide means for automatically returning said bar to its normal position, and a knob formed on the free end of said rod to provide a bearing for operating said bar and to provide a seat for one end of said spring which encircles said rod, all substantially as shown and described.

6. In a shifting mechanism containing means for shifting a belt from one to the other of two pulleys by the movement of the operating-bar in one direction, means for automatically returning said bar to its normal position, a rod projecting up from said bar above the device, a knob secured on the upper end of said rod, a channel-wheel revolubly mounted to the device below said knob, and a cord secured to said knob and extending down under said channel-wheel and projecting outward to provide means for operating the device at a distance therefrom, all substantially as shown and described.

In testimony whereof I have hereunto signed my name in the presence of two subscribing witnesses.

WILLIAM N. GARTSIDE.

Witnesses:
R. E. RANDLE,
R. W. RANDLE.